April 1, 1969        M. W. SWIFT        3,436,516
METHOD OF FORMING A CONTINUOUS ELONGATED PASSAGEWAY THROUGH METAL
Filed Feb. 9, 1966
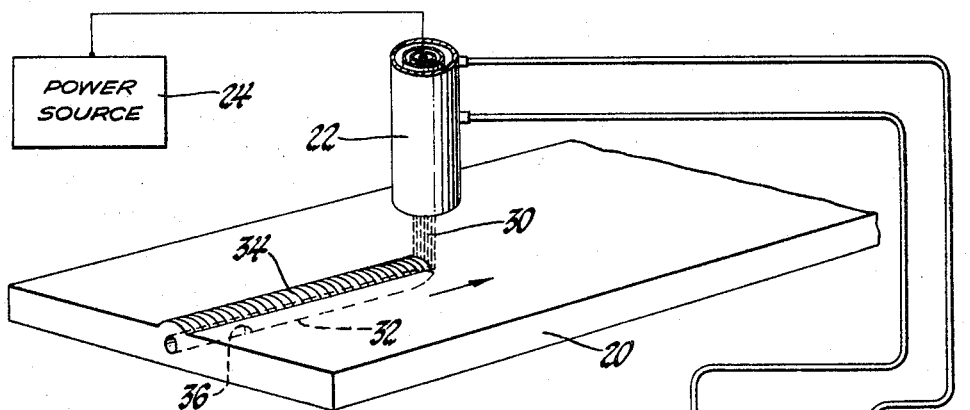
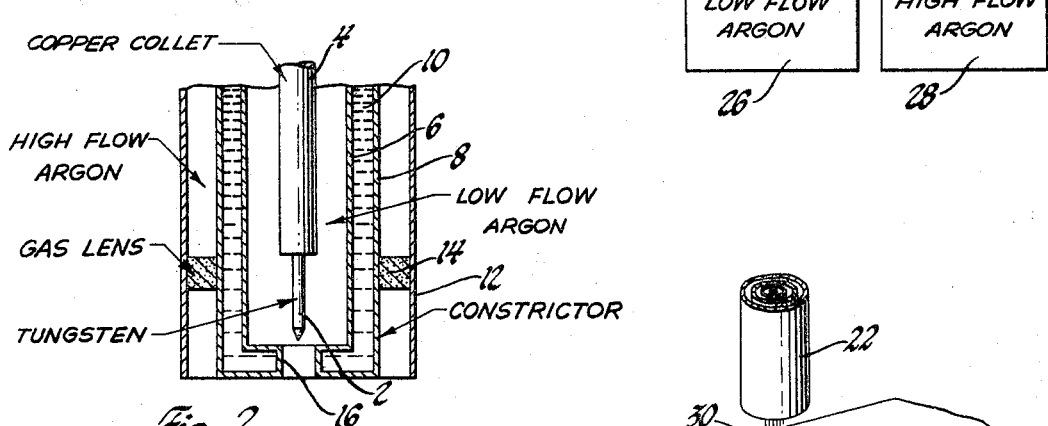
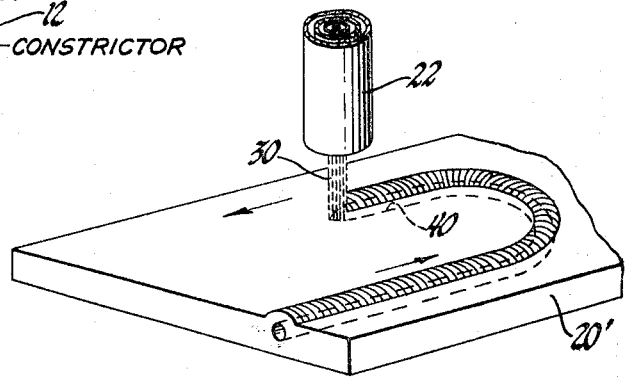
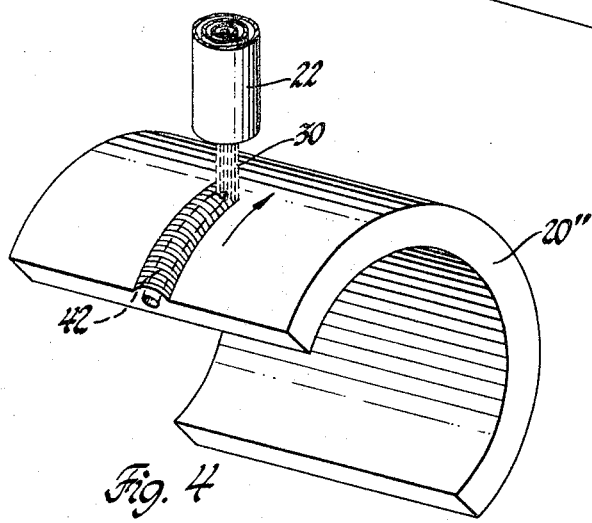
INVENTOR.
Michael W. Swift
BY Robert E. Fowler
ATTORNEY United States Patent Office 3,436,516
Patented Apr. 1, 1969

3,436,516
METHOD OF FORMING A CONTINUOUS ELONGATED PASSAGEWAY THROUGH METAL
Michael W. Swift, Speedway, Ind., assignor to General Motors Corporation, Detroit, Mich., a corporation of Delaware
Filed Feb. 9, 1966, Ser. No. 526,206
Int. Cl. B23k 9/16
U.S. Cl. 219—121          5 Claims

ABSTRACT OF THE DISCLOSURE

A method is disclosed for forming a continuous enclosed passageway in a metallic member of sufficient thickness to enfold a passageway. A plasma arc gun having predetermined parameter of electrical power and gas flow is employed to melt the surface of the workpiece to a depth of slightly more than the desired diameter of a resultant elongated passageway, but not entirely through the workpiece, such that as the molten metal hardens it leaves an opening at the lower end of the molten portion which becomes a continuous elongated passageway as the gun is moved across the surface of the workpiece in a desired configuration.

*State of the prior art*

There is no known prior art that discloses any method of forming continuous elongated passageways in metal parts that is in any manner similar to the present one. The nearest approaches are by drilling or casting which are entirely different methods.

*Description of the invention*

There are many instances in which it is desirable to provide a continuous elongated passageway in a metal part and these have caused problems in the past in the fabrication of machines, parts or other assemblies. Presently available on the market there is equipment known as a Plasmarc torch. This is normally used for either cutting metal or welding it. The Plasmarc process basically is a tungsten arc shielded by a low flow of inert gas such as argon. The arc ionizes the gas to form a plasma beam of concentrated heat. The Plasmarc torch provides a tungsten electrode and first shielding casing through which the low flow of inert gas may proceed past the electrode and be discharged from the nozzle. The torch also provides a second or outer shield through which a second high flow of inert gas may proceed for shielding purposes only. This provides a very intense concentrated beam of ionized gas for cutting or welding.

The present invention relates to a method of utilizing the Plasmarc torch to form complex continuous passageways in metal parts.

FIG. 1 is a perspective view and schematic diagram of a metal part and torch system for performing the present process;

FIG. 2 is a sectional view through a conventional Plasmarc torch; and,

FIGS. 3 and 4 are perspective views of metal parts in which various configurations of elongated passageways have been formed.

Referring now more particularly to the drawings, FIG. 2 shows a cross-section through the Plasmarc gun. The electrode 2 is formed of tungsten as indicated by the label and is supported centrally of the gun. Current is fed thereto through a copper member 4. The electrode 2 is located in a central chamber formed by cylindrical duct 6 through which inert gas flows in the forward direction under low pressure. A second concentric tube 8 surrounds the first tube 6 and in the space between there is provided a cooling medium 10 which may be water which is circulated therethrough. The outer portion of the casing is formed of an outside concentric cylindrical member 12 and through the annular passageway formed between it and the inner member 8 an inert gas flows under high pressure to form a shield around the arc. This outer gas layer passes through a filtering lens or concentrating means 14.

In operation, when electric power is applied to the electrode 2 to initiate an arc between the end of the tungsten electrode 2 and the sides of the central opening 16, the inert gas flowing past this arc will be ionized and formed into a plasma to project a concentrated, very intense beam from the nozzle which is directed toward the work. As indicated these devices are sold originally for either cutting purposes or welding purposes. It has been found that if the parameters of gas flow and electric current are carefully controlled for a particular application that the plasma beam directed against a surface of a metal part will melt only partially through the part and that if the gun is simultaneously moved transversely along the part as the metal cools, an internal elongated opening will be formed as the metal hardens.

This is best illustrated in FIG. 1 in which a metal part 20 in which it is desired to form an elongated opening is laid on a suitable support with the Plasmarc gun 22 supported in spaced relation above it. The gun has its electrode connected to a power source 24 and the two annular channels supplied with inert gas from sources 26 and 28, respectively, for the inner and outer channels. As the plasma beam 30 engages the upper surface of the member 20 it will penetrate to a level slightly below the lower dotted line 32 of the elongated opening. Then as the gun is moved along, the metal over the top will harden as shown at 34 leaving the central aperture or elongated opening 36. Either the gun may be moved over the surface of the member 20 in the direction of the arrow, or the part may be pulled under the stationary gun in the opposite direction.

In order to achieve the proper dimensions of the passage the plasma beam cannot be permitted to penetrate entirely through the material but only to a given depth and the power must be so regulated as to only penetrate part way and carefully adjusted for each particular application. As an example of one application satisfactorily fabricated, the following specific values were used. The specimen in which the elongated passageway was to be formed was a flat member .250" thick of titanium alloy. The electrical, gas flow and mechanical movement parameters were adjusted as follows:

Electrical—
    Current: 168–175 amps.
    Voltage: 26 volts.
Gas flow (cubic feet per hour)—
    Center: 10 argon, 3 helium.
    Backup (outside): 65 argon.
Travel speed: 4" per minute.

These illustrative values produced a satisfactory elongated passageway in the plate whose length was determined only by how long the power remained on and travel continued.

It will be obvious that the travel does not need to be in a straight line but can follow any desired configuration such as that shown in FIG. 2 in which the plate 20' has a U-shaped configuration of the elongated passage 40 fabricated therein much in the same way that an operator would cut the part on a band saw to form a desired configuration.

FIG. 4 shows an additional form in which the semicylindrical metal part 20" has an elongated passageway 42 formed which will eventually become an arcuate passage if the passage formation is continued from that point illustrated. This might be a bearing in which it is desired to form such a passage. This type would be impossible to drill and while it might be cast it would be difficult. The present invention would supply a relatively easy means to produce this type of elongated passage. Any variations from a regular geometric pattern are easily incorporated as it is only necessary to move the two parts relatively to produce any configuration desired, only the same spacing has to be maintained between the part and the Plasmarc gun for the same thickness of metal once the proper flow and electrical parameters have been determined.

What is claimed is:

1. A method of forming a continuous enclosed passageway in a metallic member of sufficient thickness to enfold a passageway, said metallic member capable of being melted by a plasma arc gun which comprises the steps of placing the metallic member on a support with the surface of the same in which it is desired to create an elongated passageway accessible to a beam from said gun, supporting or holding a plasma arc gun at a distance from the surface of said member and applying thereto predetermined parameters of electrical power and gas flow to cause the plasma arc to project against the surface of said member and to melt the surface directly under the nozzle of the gun to a depth of slightly more than the desired diameter of a resultant elongated passageway, but not entirely through the member, moving the gun over the surface in the desired configuration of the passageway at a fixed rate so that as the molten metal hardens it leaves an opening at the lower end of the molten portion which becomes a continuous elongated passageway as the gun progresses across the surface.

2. A method of forming a continuous elongated enclosed passageway in a metallic member formed of material capable of being melted by a plasma arc beam comprising the steps of placing the metallic member and a plasma arc gun in spaced relation with the gun aimed at a point where one end of the passageway is to be located, applying predetermined electrical and gaseous parameters to the arrangement to create a plasma arc beam that will penetrate for a short distance into the metallic member but not through the same, providing relative movement between the plasma arc gun and the metallic member along a path to follow a desired configuration of passageway so that as the plasma arc beam melts a portion of the surface of the metallic member and moves along it will leave in its wake a completely enclosed passageway imbedded in the metallic member.

3. A method of forming a continuous elongated enclosed passageway in a metallic member as defined in claim 2 in which the plasma arc gun is moved over the surface of the metallic member in a non-linear path configuration to produce the passageway.

4. A method of forming a continuous elongated enclosed passageway in a metallic member formed of material capable of being melted by a plasma arc beam comprising the steps of placing the metallic member and a plasma arc gun in spaced relation with the gun aimed at a point where one end of the passageway is to be located, applying to the gun a center gas flow in the order of 10 cubic feet per hour and a current in the order of 170 amperes to create a plasma arc beam that will penetrate for a short distance into the metallic member but not through the same, providing relative movement between the plasma arc gun and the metallic member along a path to follow a desired configuration of passageway so that as the plasma arc beam melts a portion of the surface of the metallic member and moves along it will leave in its wake a completely enclosed passageway imbedded in the metallic member.

5. A method of forming a continuous elongated enclosed passageway in a titanium alloy member comprising the steps of placing the member and a plasma arc gun in spaced relation with the gun aimed at a point where the passageway is to be located, applying sufficient voltage to the palsma arc gun to establish a plasma arc, applying to the gun current in the order of 170 amperes and supplying a center gas flow in the order of 10 cubic feet per hour to create a plasma arc beam that will penetrate for a short distance into the member but not through the same, providing relative movement between the plasma arc gun and the member along a path to follow a desired configuration of passageway so that as the plasma arc beam melts a portion of the surface of the member and moves along it will leave in its wake a completely enclosed passageway imbedded in the member.

References Cited

UNITED STATES PATENTS

| 2,858,412 | 10/1958 | Kane et al. | 219—121 |
| 2,862,099 | 11/1958 | Gage | 219—121 |
| 2,868,950 | 1/1959 | Gage | 219—74 |
| 3,204,075 | 8/1965 | Browning | 219—121 |
| 3,324,278 | 6/1967 | Jackson | 219—74 |

OTHER REFERENCES

"Recent Developments in Plasma Welding," by G. Cooper et al., April 1965, pp. 268–276, Welding Journal.

RICHARD M. WOODS, *Primary Examiner.*

W. DEXTER BROOKS, *Assistant Examiner.*

U.S. Cl. X.R.

219—74, 75